United States Patent
Fan et al.

(10) Patent No.: US 9,524,344 B2
(45) Date of Patent: Dec. 20, 2016

(54) USER INTERFACE FOR ONLINE ADS

(75) Inventors: Xiaofeng Fan, Redmond, WA (US); Helen J. Wang, Redmond, WA (US); John D. Dunagan, Bellevue, WA (US); Mansoor A. Malik, Bellevue, WA (US); Rajesh S. Batheja, Bellevue, WA (US)

(73) Assignee: MICROSOFT CORPORATION, Redmond, WA (US)

( * ) Notice: Subject to any disclaimer, the term of this patent is extended or adjusted under 35 U.S.C. 154(b) by 469 days.

(21) Appl. No.: 12/146,461

(22) Filed: Jun. 26, 2008

(65) Prior Publication Data
US 2009/0300496 A1 Dec. 3, 2009

Related U.S. Application Data

(60) Provisional application No. 61/058,214, filed on Jun. 3, 2008.

(51) Int. Cl.
*G06F 17/30* (2006.01)
*G06F 21/55* (2013.01)

(52) U.S. Cl.
CPC ..... *G06F 17/30867* (2013.01); *G06F 17/3089* (2013.01); *G06F 21/552* (2013.01)

(58) Field of Classification Search
CPC ............... G06F 21/552; G06F 2201/86; G06F 2221/2119; G06F 17/3089; G06F 17/30867
USPC .................................. 715/808, 711, 762, 804
See application file for complete search history.

(56) References Cited

U.S. PATENT DOCUMENTS

| | | |
|---|---|---|
| 4,660,868 A | 4/1987 | Totani |
| 5,987,523 A | 11/1999 | Hind et al. |
| 6,211,877 B1 | 4/2001 | Steele et al. |
| 6,351,816 B1 | 2/2002 | Mueller et al. |
| 6,526,513 B1 | 2/2003 | Shrader et al. |
| 6,691,230 B1 | 2/2004 | Bardon |
| 7,003,734 B1 | 2/2006 | Gardner et al. |
| 7,069,554 B1 | 6/2006 | Stammers et al. |
| 7,478,434 B1 | 1/2009 | Hinton et al. |

(Continued)

FOREIGN PATENT DOCUMENTS

| | | |
|---|---|---|
| KR | 20070102859 A | 10/2007 |
| WO | 02101700 A1 | 12/2002 |

(Continued)

OTHER PUBLICATIONS http://ask-leo.com/what_does_it_mean_to_hover_over_a_link_to_check_validity.html (© 2007).*

(Continued)

*Primary Examiner* — Sherrod Keaton
(74) *Attorney, Agent, or Firm* — Alin Corie; Sandy Swain; Micky Minhas (57) ABSTRACT

A user interface may be utilized to allow a user to control display properties of online ad content on a hosting webpage (e.g., hosting ads from one domain on a webpage from a different domain). This may be accomplished by creating a cross-domain frame in the hosting webpage, which can contain the ad content. An instantiation of a user interface may be created on the hosting webpage that has an ability to control display properties of the cross-domain frame, thereby controlling display properties of the ad content in the cross-domain frame. Further, a task manager may be utilized as part of the user interface to facilitate a host of the hosting webpage to manage ad content.

20 Claims, 8 Drawing Sheets

(56) References Cited

U.S. PATENT DOCUMENTS

| | | | |
|---|---|---|---|
| 7,484,247 | B2 | 1/2009 | Rozman et al. |
| 7,650,617 | B2 | 1/2010 | Hoshino et al. |
| 2002/0054126 | A1 | 5/2002 | Gamon |
| 2002/0188527 | A1* | 12/2002 | Dillard et al. ................ 705/27 |
| 2003/0093464 | A1 | 5/2003 | Clough et al. |
| 2004/0025060 | A1 | 2/2004 | Raffaele et al. |
| 2004/0199603 | A1 | 10/2004 | Tafla et al. |
| 2004/0239703 | A1 | 12/2004 | Angelica |
| 2005/0114430 | A1 | 5/2005 | Zheng et al. |
| 2005/0222902 | A1 | 10/2005 | Coit et al. |
| 2006/0010134 | A1* | 1/2006 | Davis et al. ................... 707/10 |
| 2006/0020538 | A1 | 1/2006 | Ram et al. |
| 2006/0026667 | A1 | 2/2006 | Bhide et al. |
| 2006/0031404 | A1 | 2/2006 | Kassab |
| 2006/0053048 | A1 | 3/2006 | Tandetnik |
| 2006/0069613 | A1 | 3/2006 | Marquardt |
| 2006/0271425 | A1 | 11/2006 | Goodman et al. |
| 2006/0277605 | A1 | 12/2006 | Curtis et al. |
| 2007/0016949 | A1 | 1/2007 | Dunagan et al. |
| 2007/0101258 | A1 | 5/2007 | Xu et al. |
| 2007/0107057 | A1 | 5/2007 | Chander et al. |
| 2007/0113237 | A1 | 5/2007 | Hickson |
| 2007/0136579 | A1 | 6/2007 | Levy et al. |
| 2007/0146812 | A1* | 6/2007 | Lawton ....................... 358/452 |
| 2007/0245310 | A1* | 10/2007 | Rosenstein ....... H04L 29/08072 717/116 |
| 2007/0255821 | A1* | 11/2007 | Ge et al. ..................... 709/224 |
| 2007/0256003 | A1 | 11/2007 | Wagoner et al. |
| 2007/0299857 | A1 | 12/2007 | Gwozda et al. |
| 2007/0300064 | A1 | 12/2007 | Isaacs et al. |
| 2008/0005282 | A1* | 1/2008 | Gaedcke .......... G06F 17/30867 709/219 |
| 2008/0046562 | A1 | 2/2008 | Butler |
| 2008/0091845 | A1* | 4/2008 | Mills ................. G06F 17/30902 709/246 |
| 2008/0162227 | A1* | 7/2008 | Jakobsson et al. ................ 705/7 |
| 2008/0262913 | A1* | 10/2008 | Reitz ................... G06Q 30/0236 705/14.36 |
| 2008/0263566 | A1 | 10/2008 | Buerge et al. |
| 2008/0288885 | A1 | 11/2008 | Ide et al. |
| 2008/0301643 | A1 | 12/2008 | Appleton et al. |
| 2008/0313648 | A1 | 12/2008 | Wang et al. |
| 2009/0037517 | A1 | 2/2009 | Frei |
| 2009/0037806 | A1 | 2/2009 | Tang et al. |
| 2009/0164949 | A1* | 6/2009 | Henkin .................. G06Q 30/02 715/862 |
| 2009/0187918 | A1 | 7/2009 | Chen et al. |
| 2009/0265760 | A1 | 10/2009 | Zhu et al. |
| 2009/0276835 | A1 | 11/2009 | Jackson et al. |
| 2010/0064234 | A1* | 3/2010 | Schreiber ........... G06Q 30/0273 715/760 |

FOREIGN PATENT DOCUMENTS

| | | |
|---|---|---|
| WO | 2008024706 A2 | 2/2008 |
| WO | WO 2008/036969 A2 | 3/2008 |

OTHER PUBLICATIONS http://ask-leo.com/what_does_it_mean_to_hover_over_a_link_to_check_validity.html ("Leo" © 2007).*

U.S. Appl. No. 12/146,460, Fan et al., filed Jun. 26, 2008.

U.S. Appl. No. 12/147,620, Fan et al., filed Jun. 27, 2008.

U.S. Appl. No. 61/058,213, Fan et al., filed Jun. 3, 2008.

U.S. Appl. No. 61/058,214, Fan et al., filed Jun. 26, 2008.

"From Coffee to Celebrity Sightings: How Mashups are Changing Online Mapping", Copyright: 2007, pp. 1-6.

Howell, et al. "MashupOS: Operating System Abstractions for Client Mashups", Proceedings of the 11th USENIX workshop on Hot topics in operating systems, Date: 2007, 7 Pages, Article No. 16, USENIX Association Berkeley, CA, USA.

Jackson, et al. "Subspace: Secure CrossDomain Communication for Web Mashups", Proceedings of the 16th international conference on World Wide Web, Date: May 8-12, 2007, pp. 611-620, ACM Press New York, NY, USA.

Keukelaere, et al. "SMash: Secure Component Model for Cross-Domain Mashups on Unmodified Browsers", Proceeding of the 17th international conference on World Wide Web, Date: Apr. 21-25, 2008, pp. 1-13, ACM Press New York, NY, USA.

Reis, et al. "BrowserShield: Vulnerability-Driven Filtering of Dynamic HTML", Date: Sep. 2007, 14 Pages, vol. 1, Issue: 3, ACM Press New York, NY, USA.

Yoshihama, et al. "Security Model for the Client-Side Web Application Environments", May 24, 2007, 2 Pages.

Reply second Chinese Office Action cited in Chinese Appliction No. 200980121187.8 dated Sep. 13, 2012, 12 pgs.

Third Chinese Office Action cited in Chinese Application No. 200980121187.8 dated Feb. 5, 2013, 7 pgs.

EP Search Report cited in EP Application No. 09759142.4 dated Jan. 9, 2013, 6 pgs.

EP Communication cited in EP Application No. 09759142.4 dated Jan. 28, 2013, 1 pg.

Non-Final Office Action cited in U.S. Appl. No. 12/146,460 dated Jun. 6, 2011, 31 pgs.

Reply to Non-Final Office Action cited in U.S. Appl. No. 12/146,460 dated Aug. 24, 2011, 16 pgs.

Final Office Action cited in U.S. Appl. No. 12/146,460 dated Jan. 4, 2012, 33 pgs.

Reply to Final Office Action cited in U.S. Appl. No. 12/146,460 dated Apr. 2, 2012, 14 pgs.

Non-Final Office Action cited in U.S. Appl. No. 12/147,620 dated Feb. 7, 2011, 20 pgs.

Reply to Non-Final Office Action cited in U.S. Appl. No. 12/147,620 dated May 5, 2011, 15 pgs.

Final Office Action cited in U.S. Appl. No. 12/147,620 dated Jul. 25, 2011, 20 pgs.

Reply to Final Office Action cited in U.S. Appl. No. 12/147,620 dated Sep. 30, 2011, 15 pgs.

International Search Report cited in PCT Application No. PCT/US2009/045765 dated Dec. 22, 2009, 9 pgs.

International Preliminary Report on Patentability cited in PCT Application No. PCT/US2009/045765 dated Dec. 6, 2010, 4 pgs.

First Chinese Office Action cited in Chinese Application No. 200980121187.8 dated Nov. 23, 2011, 6 pgs.

Reply to first Chinese Office Action cited in Chinese Application No. 200980121187.8 dated Dec. 27, 2011, 11 pgs.

Second Chinese Office Action cited in Chinese Application No. 200980121187.8 dated Jul. 4, 2012, 6 pgs.

"Securing Frame Communication in Browsers", Adam Barth, Collin Jackson and John C. Mitchell, 2008, reprinted from the Internet at: http://seclab.stanford.edu/websec/frames/post-message.pdf., 14 pgs.

"Caja Safe Active Content in Sanitized JavaScript", Mark S. Miller, Mike Samuel, Ben Laurie, Ihab Awad and Mike Stay, Jan. 15, 2008, reprinted from the Internet at: http://google-caja.googlecode.com/files/caja-space-2008-01-15.pdf, 26 pgs.

"Secure Cross-Domain Communication in the Browser", The Architecture Journal, Danny Thorpe, 2008, reprinted from the Internet at: http://msdn.microsoft.com/en-us/library/bb735305.aspx, 6 pgs.

"Frames in HTML documents", HTML 4.01, W3C, Dec. 24, 1999, reprinted from the Internet at: http://www.w3.org/TR/html401/present/frames.html, 14 pgs.

Non-Final Office Action cited in U.S. Appl. No. 12/147,620 dated Mar. 15, 2013, 19 pgs.

Reply Non-Final Office Action cited in U.S. Appl. No. 12/147,620 dated Jun. 17, 2013, 12 pgs.

Reply third Chinese Office Action cited in Chinese Application No. 200980121187.8 dated Apr. 16, 2013, 3 pgs.

Non-Final Office Action cited in U.S. Appl. No. 12/146,460 dated Jan. 2, 2014, 28 pgs.

Reply Non-Final Office Action cited in U.S. Appl. No. 12/146,460 dated Apr. 2, 2014, 11 pgs.

Final Office Action cited in U.S. Appl. No. 12/147,620 dated Aug. 15, 2013, 19 pgs.

(56) References Cited

OTHER PUBLICATIONS

Reply Final Office Action cited in U.S. Appl. No. 12/147,620 dated Nov. 15, 2013, 12 pgs.
Non-Final Office Action cited in U.S. Appl. No. 12/147,620 dated Jan. 27, 2014, 18 pgs.
Reply Non-Final Office Action cited in U.S. Appl. No. 12/147,620 dated Apr. 28, 2014, 12 pgs.
Fourth Chinese Office Action cited in Chinese Application No. 200980121187.8 dated Aug. 5, 2013, 10 pgs.
Reply fourth Chinese Office Action cited in Chinese Application No. 200980121187.8 dated Oct. 17, 2013, 5 pgs.
Fifth Chinese Office Action cited in Chinese Application No. 200980121187.8 dated Nov. 11, 2013, 7 pgs.
Reply fifth Chinese Office Action cited in Chinese Application No. 200980121187.8 dated Jan. 21, 2014, 6 pgs.
Sixth Chinese Office Action cited in Chinese Application No. 200980121187.8 dated Apr. 15, 2014, 8 pgs.
Reply EP Communication cited in EP Application No. 09759142.8 dated Jul. 8, 2013, 14 pgs.

* cited by examiner

USER INTERFACE FOR ONLINE ADS

REFERENCE TO RELATED APPLICATION

This application claims priority to and the benefit of U.S. Provisional Application Ser. No. 61/058,214 which was filed Jun. 3, 2008, entitled USER INTERFACE FOR ONLINE ADS, the entirety of which is hereby incorporated by reference as if fully set forth herein.

BACKGROUND

In a computing environment, websites and associated webpages often host online advertisements, intended to be viewed by online users of the respective websites. Online advertisements typically come from a different domain than that of the hosting website. Online advertisers and hosting websites typically work with an ad syndicator, which takes calls for ads from the host, pulls ads from the advertiser, and then directs the ads to the host's website. Often, online ads have rich functionality, including an ability to expand and/or move about a webpage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Typically, when a webpage displays an online ad, the display properties of the ad can be controlled by an owner of the ad and/or the hosting webpage. As an example, when a hosting webpage wishes to host an ad it may call to an ad syndicator for an ad, indicating specifications (e.g., height, width) for an open ad-space in the host webpage. The ad syndicator can pull an ad from a catalogue of ads supplied by advertisers, which meets the specifications supplied by the host webpage. In this example, the ad is placed directly into the host webpage, in such a way that it meets the display specifications of the host webpage. When this occurs, as long as the ad meets the hosting webpage specifications, the ad is often allowed to provide rich functionality, including changing its size and/or position on the host webpage.

However, webpage viewers often find it quite annoying when ads expand over host webpage content, fly around the page, or follow the viewer as they scroll through a webpage, for example. It may be desirable to allow webpage viewers (users) to control display properties of online ad content while accessing a webpage. Current or prior solutions include placing functional controls inside the ad content, such as closing an ad, closing and expanding ad content, or some other display function. However, these controls are typically supplied by the ad owner, therefore, if an ad content is not functioning properly (e.g., if it becomes stuck open) or the ad owner uses a display of a function to "trick" a user into clicking on the ad content, these controls may not be effective.

Techniques and systems are provided herein for creating an interface for users to control display properties of online ad content on a webpage. The techniques and systems create a cross-domain frame in a host webpage (e.g., a cross-domain inline frame (IFrame)), which may be utilized to host ad content. An application program interface (API) can be utilized to create a user interface on the hosting webpage that maintains functional control of display properties of the cross-domain frame. For example, the API can be used by a host to determine which components of the user interface may be implemented, and a link to a JavaScript file from an ad syndicator may be established for the host webpage. Components of the user interface that may be utilized can include, for example, closing the IFrame, minimizing the IFrame, maximizing the IFrame, and resizing the IFrame. Further, for example, a colored border may be utilized that distinguishes IFrame content from host webpage content. Additionally, for example, a tool bar and/or a tooltip box may be utilized that displays an ad content source upon mouseover. After the user interface is established for the host webpage, the host webpage can, for example, allow users to control display properties of the IFrame (e.g., including the ad content in the IFrame).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
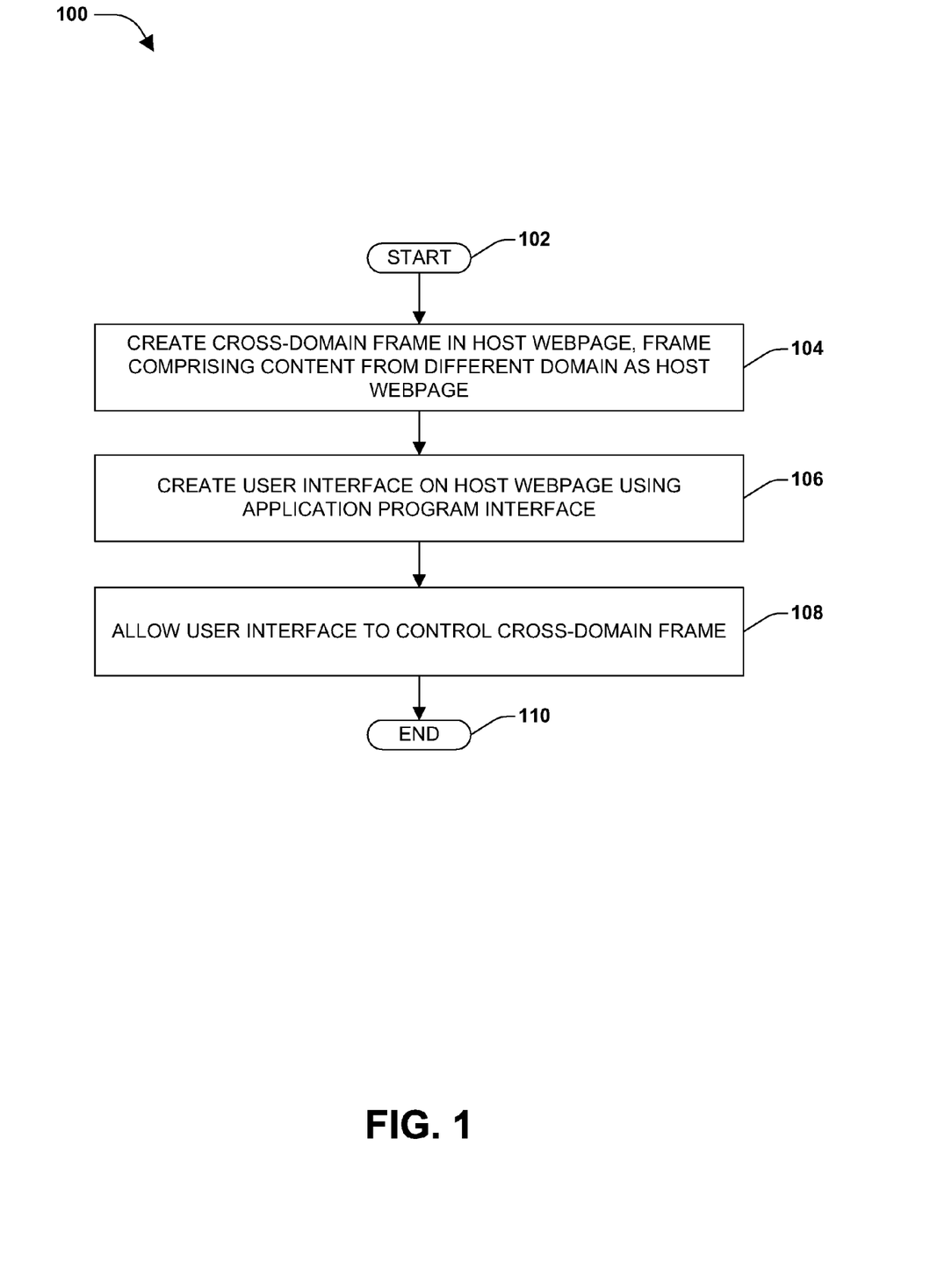
FIG. 1 is a flow chart illustrating an exemplary method of providing user control of online ad content on a host webpage.

FIG. 1 is a flow chart illustrating an exemplary method 100 for creating an interface for users to control display properties of online ad content on a webpage. The exemplary method 100 begins at 102 and involves creating a cross-domain frame in a host webpage, at 104, with the frame comprising content from a different domain than the domain of the host webpage. As an example, a cross domain frame may be an inline frame (IFrame) that is configured to contain an online ad created and hosted by a different domain than that of the host webpage. Further, in this example, the IFrame can be configured to be substantially isolated from the host webpage so that content inside the IFrame may not interact with content outside the IFrame (e.g., the ad content may not manipulate the host webpage and/or content thereon). In this way, security can be provided so that, while display properties of the ad content may be controlled by a user interface, the ad content may not be manipulated, nor may the ad content interact with the host webpage.

At 106, a user interface (UI) is created in code of the host webpage using an application program interface (API). A UI, for example, can be created that may control display properties of an IFrame. As an example, an API used to facilitate ad hosting on a host webpage may be used by a host to determine whether the UI will be used on their host webpage. Further, the host may choose which portions of the UI will be utilized on the host webpage.

In this example, in order to create a UI on the host webpage, a link may be made between the code of the host webpage and a file (e.g., a JavaScript file) from an ad syndicator that instantiates the UI on the host webpage. It will be appreciated that coding for the UI may be directly installed into the code of the host webpage, may be stored in another location and referenced by the website, or may be obtained in another manner devised by those skilled in the art. The techniques and systems, described herein, are not limited to one particular technique for creating an instantiation of the UI on the host webpage.

In exemplary method 100, at 108, the user interface is allowed to control the cross-domain frame (e.g., control the display properties of an IFrame). As an example, host webpage viewers (users) may be allowed to access the UI to control display properties of the cross-domain frame. In this way, because ad content is contained within the cross-domain frame, the users can be allowed to control display properties of the ad content. In this example, if the ad content contains a bug that causes it to remain in an expanded state (e.g., expanded over host webpage content) a user may be allowed to close the cross-domain frame, thereby closing the buggy ad content.

Having allowed the user interface to control the cross-domain frame, the exemplary method 100 ends at 110.

Figure 2:
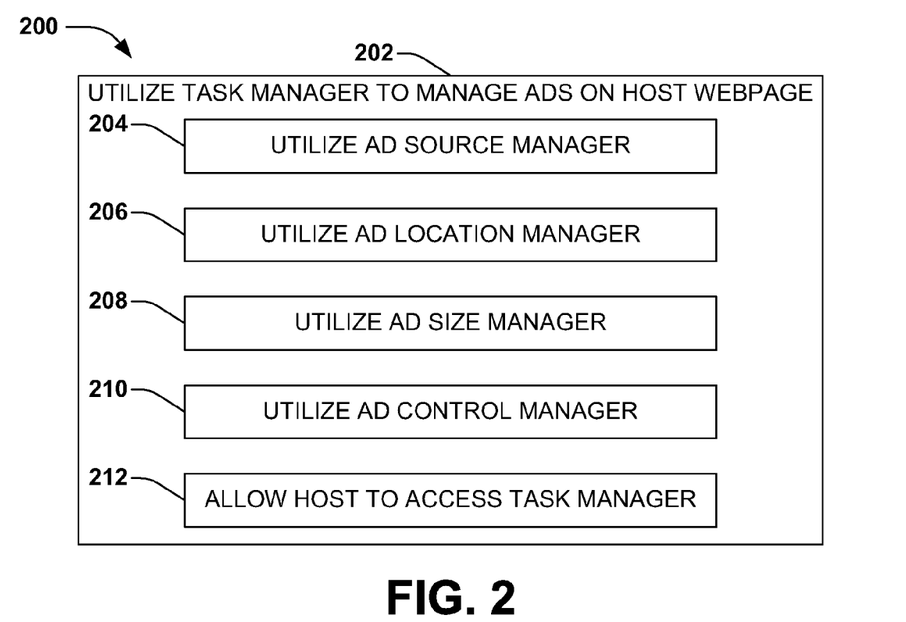
FIG. 2 is a block diagram illustrating an exemplary task manager portion of an exemplary method of providing user control of online ad content on a host webpage.

In one aspect, a website host may wish to utilize a task manager to manage ads hosted on a host webpage. For example, a task manager may be an instantiation of a user interface, accessible by the host, which can assist the host in managing a location, size, functionality, or other properties of ads hosted on a webpage. FIG. 2 is a block diagram illustrating an exemplary method 200 for utilizing a task manager to manage ads on a host webpage, which may be used in conjunction with the exemplary method 100 described in FIG. 1.

In this exemplary method 200, utilizing a task manager to manage ads on the host webpage, at 202, may comprise utilizing an ad source manager, at 204. For example, if the host wishes to identify a source of the ad content, the task manager can display an IP address of an owner of the ad. In this example, the task manager can be linked directly to an ad syndicator, which supplies the ad content to the host webpage. In this way, the ad syndicator may have access to the source of the ad and can supply it to the host using the task manager.

In the exemplary method 200, utilizing a task manager to manage ads on the host webpage, at 202, may further comprise utilizing an ad location manager, at 206, and utilizing an ad size manager, at 208. For example, if the host wishes to identify and manage a location and size of ad content on the host webpage, the task manager can display the size and location to the host. Further, in this example, the task manager can be enabled to allow the host to resize or relocate the ad content on the host webpage. The task manager can be linked to an ad syndicator, which can determine if the adjusted location and/or size, as changed by the host, meet the specifications set forth by the ad owner, for example. Additionally, in this example, the ad syndicator may enable the task manager to only allow the host to relocate and/or resize the ad content if it meets specifications set forth by the ad owner.

In the exemplary method 200, utilizing a task manager to manage ads on the host webpage, at 202, may further comprise utilizing an ad control manager, at 210. For example, the host may wish to activate or deactivate hosting particular ad content on the host webpage. In this example, the task manager can list respective ads in the UI for the host to select. A host may be able to select a particular ad from the list, for example, for deactivation or activation. The task manager can be directly linked to the ad syndicator, which may remove/insert the particular ad content from the host webpage.

It will be appreciated that, while the examples above describe an active link between the task manager and the ad syndicator, to facilitate managing ad content, the techniques and systems, described herein, are not limited to a task manager being linked directly to an ad syndicator. A task manager, for example, may stand alone as an UI in the host webpage, and may be able to perform the actions described above without a direct link to an ad syndicator, or by using other methods devised by those skilled in the art.

At 212, of the exemplary method 200, utilizing the task manager to manage ads on a host webpage may comprise allowing the host to access the task manager. In this aspect, as an example, allowing the host to access the task manager can give them an ability to perform the various ad management tasks described above. However, a task manager may be devised that automatically performs ad management based on host preferences, or other methods devised by those skilled in the art.

In another aspect, creating a UI on the host webpage may be performed using an API, for example, that is configured to facilitate the host webpage hosting ad content from an ad syndicator. In one embodiment, a source code interface (e.g., a set of application program interfaces (APIs)) may be devised that provides an interface for a host webpage to communicate ad content parameters and restrictions to an ad syndicator. Additionally, in this embodiment, the set of APIs may be used to create an instantiation of the UI on the host webpage. As an example, the APIs may provide a set of UI parameters that a host of the hosting webpage can choose from, which can become part of the UI to be used by webpage viewers (users).

Figure 3:
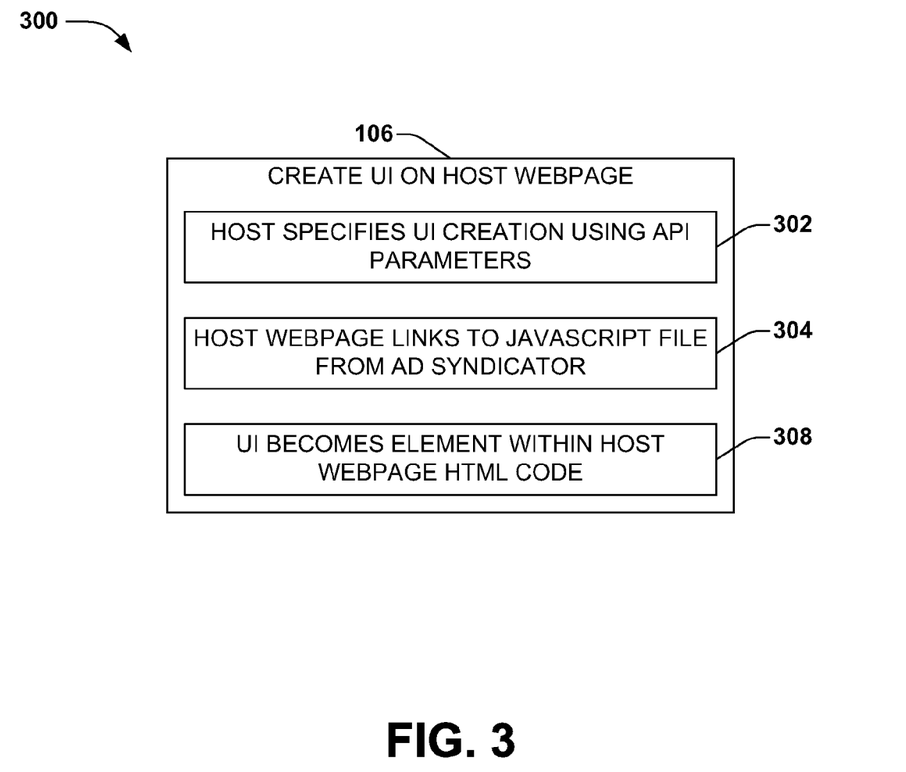
FIG. 3 is a block diagram illustrating an exemplary user interface portion of an exemplary method of providing user control of online ad content on a host webpage.

FIG. 3 is a block diagram of one embodiment of an exemplary method 300 for creating the UI on a host webpage 106 (from FIG. 1). At 302, the host can specify whether to create a UI (e.g., to control display properties of a cross-domain IFrame) using API parameters. As an example, a host of a website may wish to allow users to control display properties of ad content on their webpage. In this embodiment, ad content is placed inside cross-domain frames (IFrames), which can create a default isolation from the hosting webpage content. Therefore, to control ad content display properties, one may need merely to be able to control the IFrame display properties. In this way, if the host uses the API to create a UI that allows users to control IFrame display properties, the users may also control ad content display properties. Further, as an example, the API set may provide a menu of UI options to the host, from which the host can choose to customize the UI and the user control experience.

In this embodiment of the exemplary method 300, at 304, the host webpage can link to a JavaScript file from the ad syndicator. In this embodiment, an instantiation of the UI is created on the hosting webpage by linking to a file, for example, at the ad syndicator's site. In this example, instead of injecting additional code for a UI into the hosting webpage source code, a link is created between the hosting webpage and the UI program file at the ad syndicator's site. In this way, a secure ad serving experience can be provided for both the host webpage and the ad owner or syndicator. For example, if a webpage host used their own UI code, they may devise a way to forge user clicks (e.g., increase an amount of times user's (appear to) click on an ad) in order to increase an amount paid to the host by the ad owner (e.g., a type of click-fraud, whereby host's are paid more by ad owners when ads are clicked on more by users).

It will be appreciated that, while the embodiment above describes linking a hosting webpage to a code file from an ad syndicator, the techniques and systems, described herein, are not limited to this embodiment. For example, UI program code may be directly injected into a hosting webpage to create a UI to control ad content. Further, other techniques may be devised by those skilled in the art that enable an instantiation of a UI on the hosting webpage that controls ad content.

In this embodiment of the exemplary method 300, at 308, the UI becomes an element within the hosting webpage's hypertext markup language (HTML) code. As an example, the UI may become a <table> element in the host webpage HTML. In this embodiment, the UI is merely able to control those properties of the IFrame, for example, that were previously specified by the host. While the UI is an element in the host webpage code, it may not have an ability to interact with content inside the IFrame. It will be appreciated that the UI may be instantiated into the host webpage using other means devised by those skilled in the art. The techniques and systems, described herein, are not limited to the UI being an element in the HTML code of the host webpage.

In another aspect, once a UI is generated on a hosting webpage, it may be allowed to control a cross-domain frame (IFrame). In one embodiment, the UI may be limited to controlling specific display parameters of the IFrame and, because the IFrame can contain ad content, controlling specific display parameters of the ad content inside the IFrame, for example. Display parameters, for example, may include minimizing, maximizing, and/or closing an IFrame on the host webpage. Further, in this example, display parameters can include displaying a title bar and/or a tool tips box in the IFrame. Additionally, in this example, a border may be displayed around the IFrame, distinguishing its contents from that of the host webpage. Other display parameters may include an ability to resize and/or move the IFrame within the host webpage.

Figure 4:
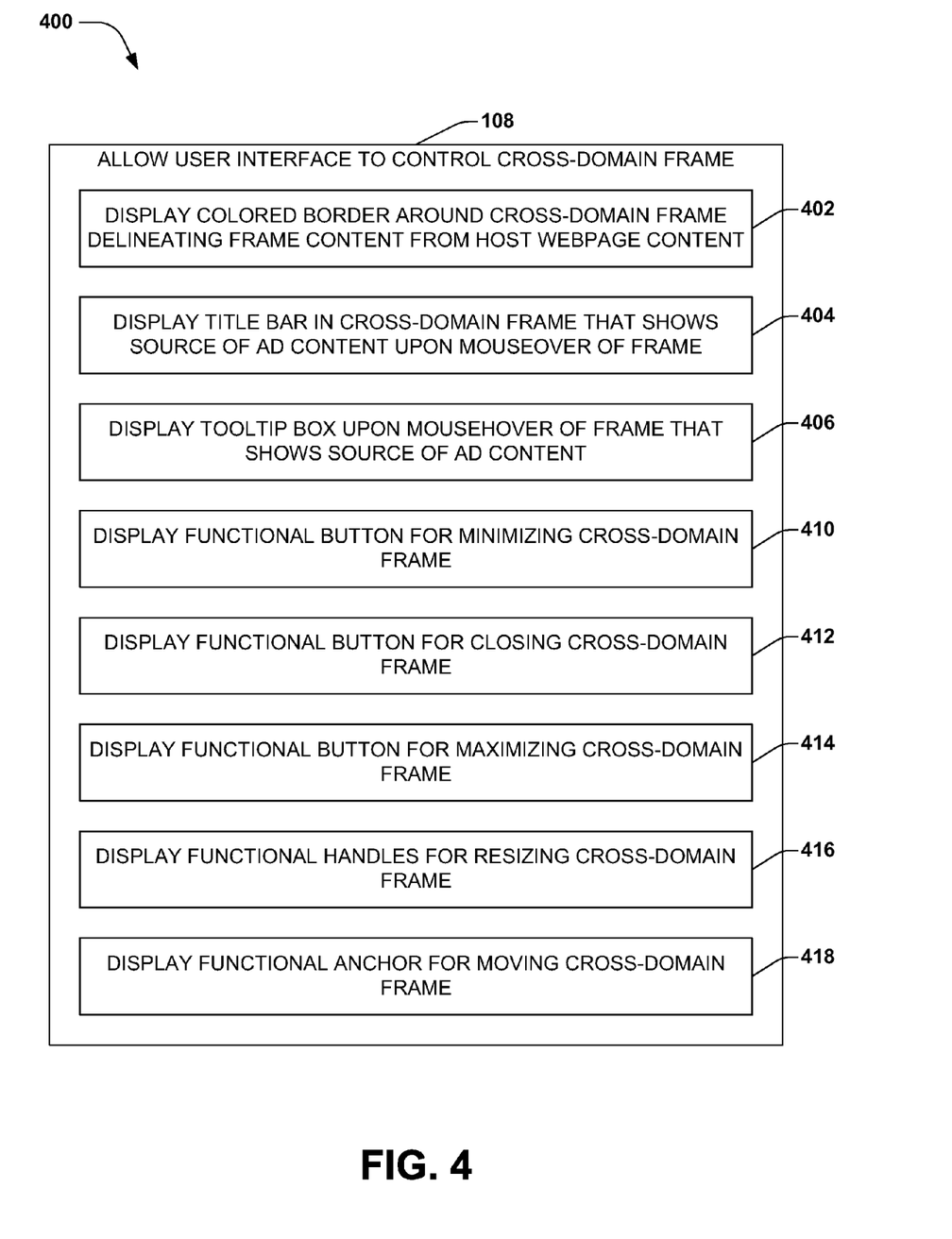
FIG. 4 is a block diagram illustrating an exemplary user interface control portion of an exemplary method of providing user control of online ad content on a host webpage.

FIG. 4 a block diagram of one embodiment of an exemplary method 400 for allowing a UI to control a cross-domain frame 108 (from FIG. 1). At 402, a colored border may be displayed around a cross-domain frame (IFrame) that delineates contents of the IFrame (e.g., ad content) from contents of a host webpage. As an example, the UI may place a thick orange line at the border between the IFrame and the host webpage content, which could help a user in distinguishing between ad content and host content on a host webpage. It will be appreciated that, while a colored border is described in the embodiment above, the techniques and systems, described herein, are not limited to this technique for distinguishing between IFrame content and host content on a webpage. Other means for distinguishing between IFrame content and host webpage content may be devised by those skilled in the art.

In this embodiment of the exemplary method 400, at 404, a title bar may be displayed in the IFrame that shows a source for ad content (e.g., an owner of the ad content) inside the IFrame, upon a mouseover of the ad content in the IFrame. Further, at 406, a tooltip box may be displayed that shows a source for ad content inside the IFrame, upon a mouseover of the ad content in the IFrame. As an example, while a user's cursor is not over the ad content in the IFrame, a title bar in the IFrame may display host content. However, in this example, when the user moves the cursor over (mouseover) the ad content in the IFrame, the title bar can display the source of the ad content to the user. Further, in this embodiment, when a user stops their cursor over (mousehover) the ad content a tooltip box can pop up that shows the source of the ad content to the user.

In this embodiment of the exemplary method 400, at 410, 412, and 414, functional buttons may be displayed that allow a user to respectively minimize, close, and maximize the IFrame within the host webpage. As an example, the UI may display buttons that, when clicked on, enable a user to minimize, close, or maximize the IFrame. In this way, the user can control whether they wish to see, and how they wish to see ad content inside the IFrame. In this embodiment, an advantage of utilizing the UI to perform these functions, rather than allowing the ad content to provide these functions, is that if the ad content is either malicious or does not function properly, the user can decide to close or minimize it.

In this embodiment of the exemplary method 400, at 416, functional handles may be displayed that provide for resizing of the IFrame. Further, at 418, functional anchor points may be displayed that provide for moving the IFrame within the host webpage. As an example, if a user wishes to display a custom size of the IFrame (e.g., to display only a portion of an expanded ad content, such as a video playing within the IFrame), when the user moves their cursor to the border, expansion arrows can be displayed that allow the user to resize the IFrame. Additionally, in this example, if the user wishes to move an IFrame to another location in the host webpage (e.g., if expanded ad content covers a portion of the host webpage that the user wishes to view), when the user moves their cursor to a particular location, an anchor point may be displayed that allows the user to move the IFrame.

It will be appreciated that, while particular display properties for a cross-domain frame have been described in this embodiment, the techniques and systems, described herein, are not limited to these particular display properties. In a computing environment, there are many varied properties that may be associated with a cross-domain frame on a webpage, and those skilled in the art may devise ways to utilize the UI to control these properties.

Figure 5:
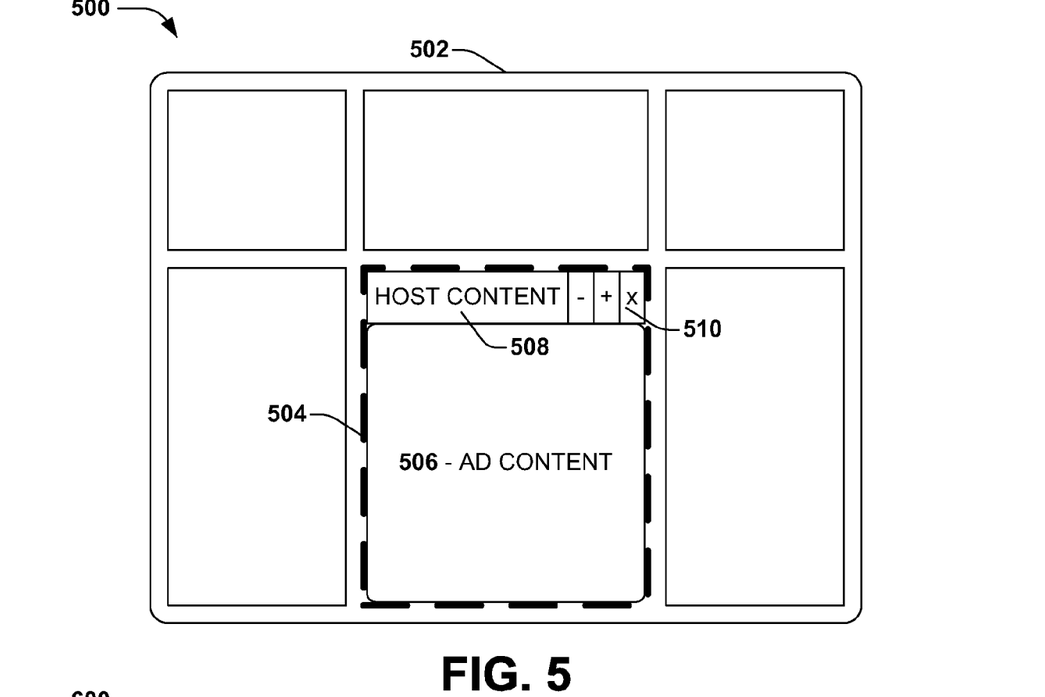
FIG. 5 is a component block diagram illustrating one embodiment of an exemplary user interface for providing user control of online ad content on a host webpage.

A user interface (UI) may be devised that provides a host webpage an interface for users to control display properties of online ad content on a webpage. FIG. 5 illustrates an exemplary embodiment 500 of a UI. In the exemplary embodiment 500 a host webpage 502 has an instance of a user UI 504 instantiated thereon. It will be appreciated that, while this exemplary embodiment 500 illustrates an instance of one UI, a set of more than one UIs may be instantiated onto a host webpage comprising various parameters related to displaying the ad content on the host webpage.

In the exemplary embodiment 500, the host webpage comprises ad content 506 and host content in a title bar 508, inside a cross-domain frame 504. In this embodiment, the UI comprises functional controls 510, which are operably coupled to the cross-domain frame 504, and the controls 510 are configured to affect display propertied of the cross-domain frame 504. In this example, the controls 510 can be used to minimize, maximize or close the cross-domain frame 504 within the host webpage 502.

Figure 6:
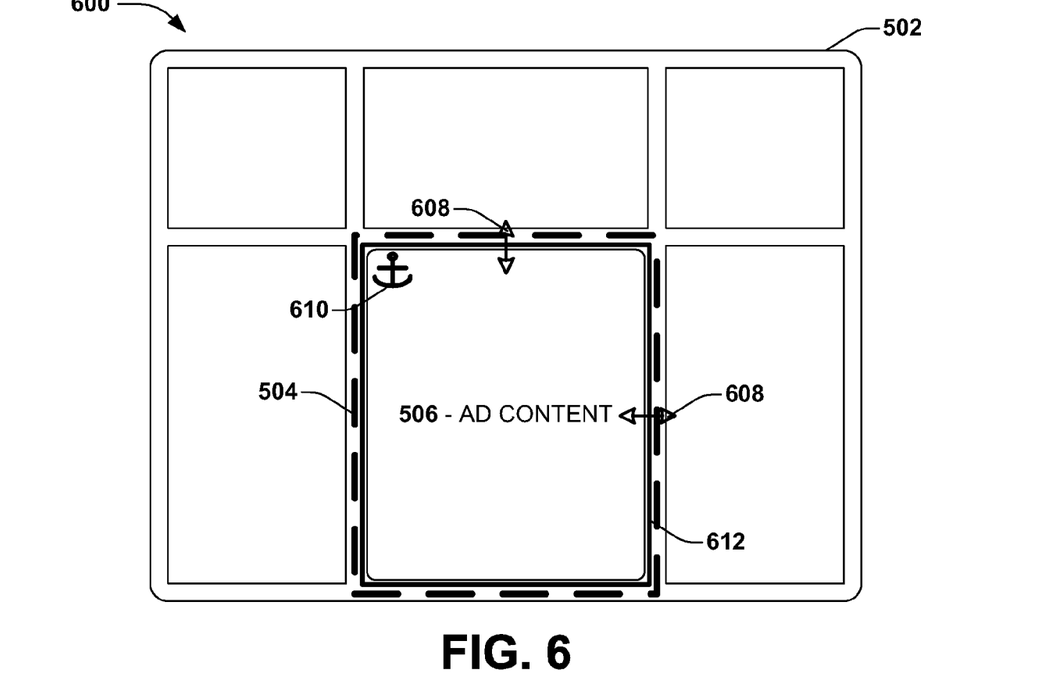
FIG. 6 is a component block diagram illustrating second embodiment of an exemplary user interface for providing user control of online ad content on a host webpage.

FIG. 6 is an illustration of another embodiment 600 of the exemplary user interface (UI) (500 in FIG. 5). In this embodiment 600, the host webpage 502 contains a cross-domain frame 504, which comprises ad content 506. The UI comprises functional controls 608 and 610, operably coupled to the cross-domain frame 504, and the controls 608 and 610 are configured to affect display propertied of the cross-domain frame 504. In this embodiment 600, expansion arrow functional controls 608 may be utilized to resize the cross-domain frame 514, thereby resizing the ad content 506, for example. Further, an anchor point functional control 610 may be utilized by a user to move the cross-domain frame 504 within the host webpage 502, for example.

Additionally, in this embodiment 600, the UI comprises a border delineation component, configured to display a border 612 delineating the cross-domain frame 504 content from the host webpage 502 content. In this example, the border delineation component displays a thick black line 612 denoting the border of the cross-domain frame 504. It will be appreciated that the border delineation component may be configured, by those skilled in the art, to display other visual effects that can distinguish the cross-domain frame content from the host webpage content, and is not limited to a thick black line.

Figure 7:
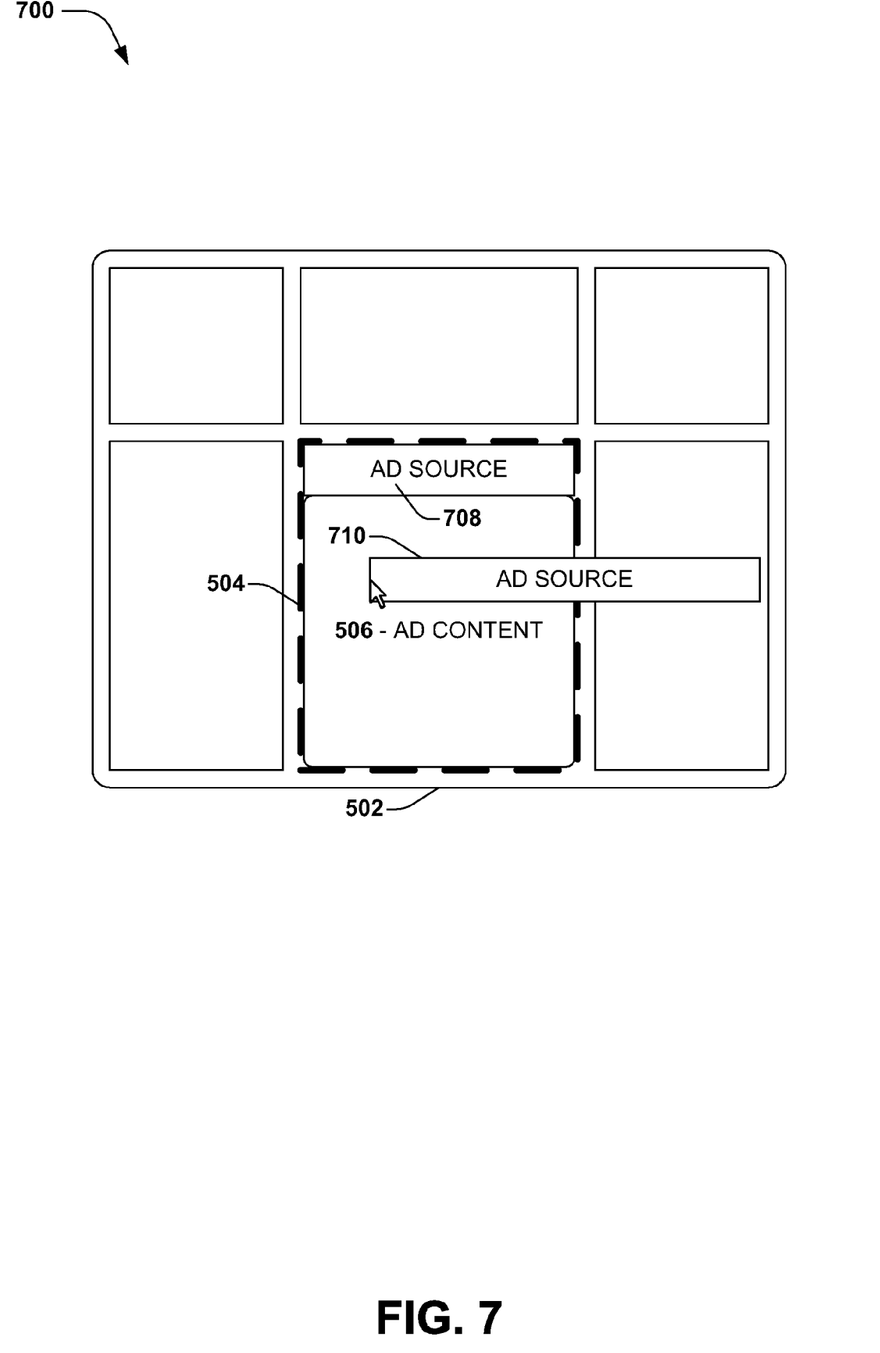
FIG. 7 is a component block diagram illustrating third embodiment of an exemplary user interface for providing user control of online ad content on a host webpage.

FIG. 7 is an illustration of another embodiment 700 of the exemplary user interface (UI) (500 in FIG. 5). In this embodiment 700, the host webpage 502 contains a cross-domain frame 504, which comprises ad content 506. The UI comprises a title bar 708, which may be configured to display a source of the ad content 506 (e.g., the site for the ad owner) upon a mouseover event (e.g., a user moves a cursor over the ad content) over the ad content 506. Further, the UI comprises a tooltip box 710, which may be configured to pop up at a site of a cursor and display a source of the ad content 506 upon a mouseover event (e.g., the user stops the cursor over the ad content) over the ad content 506. In this embodiment, for example, when the user moves the cursor over the ad content 506, the title bar 708 displays the source of the ad content. Additionally, when the user stops the cursor over the ad content 506 a tooltip box 710 pops up at the site of the cursor, displaying the source of the ad content 506.

It will be appreciated that, while the exemplary embodiments 500, 600, and 700 illustrate various components of a UI utilized in a variety of combinations, the UI is not limited to these configurations. The UI may comprise one or more components that control display properties of the cross-domain frame. Further, these components may be used individually or in a variety of combinations in one or more than one UI on a host webpage. Those skilled in the art may devise UI configurations that include the described parameters and/or additional parameters. Further, those skilled in the art may devise UI configurations that include a variety of combinations of parameters configured to control display properties of a cross-domain frame.

Figure 8:
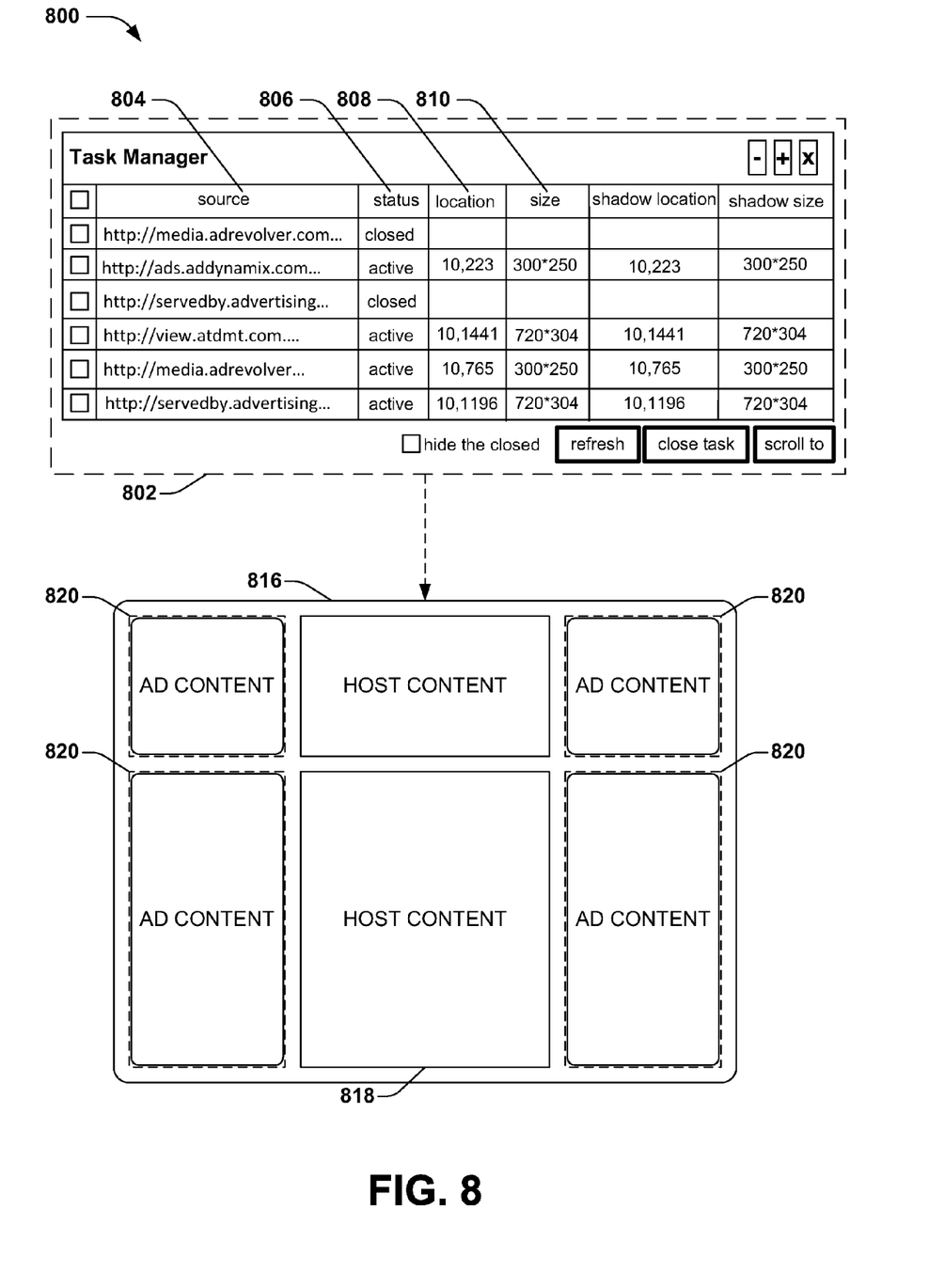
FIG. 8 is an illustration and block diagram illustrating a task manager user interface for managing online ad content on a host webpage.

In one aspect, a user interface may comprise a task manager, accessible by a host of a hosting webpage, configured to manage ad content on the host webpage. For example, a task manager may be a component of a user interface, accessible by the host, which can assist the host in managing a location, size, functionality, or other properties of ads hosted on a webpage. FIG. 8 is an illustration of one embodiment 800 of an exemplary task manager 802, which may be utilized to manage ads on a host webpage 816, for example, in conjunction with the exemplary UI 500 described in FIG. 5.

In this embodiment 800, the task manager 802 may comprise an ad source manager 804, configured to identify a source of ad content 820 (e.g., an owner of the ad content). For example, if the host wishes to identify a source of the ad content 820, the task manager 802 can display a web address of an owner of the ad content 820. In this example, the task manager 802 may be linked directly to an ad syndicator, which can supply the ad content 820 to the host webpage 816. In this way, the ad syndicator may have access to the source of the ad and can supply it to the host using the task manager 802.

In the exemplary embodiment 800, the task manager 802 may further comprise an ad location manager 808, configured to manage a location of the ad content 820 on the host webpage 816. Further, the task manager 802 may further comprise an ad size manager 810, configured to manage a size of the ad content 820 on the host webpage 816. For example, if the host wishes to identify and manage a location and size of ad content 820 on the host webpage 816, the task manager 802 can display the size and location to the host. Further, in this example, the task manager 802 may be configured to allow the host to resize or relocate the ad content 820 on the host webpage 816. Additionally, the task manager 802 may be linked to the ad syndicator, which can determine if the adjusted location and/or size, as changed by the host, meet the specifications set forth by the ad owner, for example. Also, in this example, the ad syndicator may enable the task manager 802 to only allow the host to relocate and/or resize the ad content 820 if it meets specifications set forth by the ad owner.

In the exemplary embodiment 800, the task manager 802 may further comprise an ad control manager 806, configured to manage an activity status of the ad content 820 on the host webpage 816. For example, the host may wish to activate or deactivate hosting of particular ad content on the host webpage 816. In this example, the task manager 802 can list respective ads in the UI for the host to select. A host may be able to select a particular ad from the list, for example, for deactivation or activation. Further, the task manager may be directly linked to the ad syndicator, which may remove/insert the particular ad content from the host webpage 816.

Figure 9:
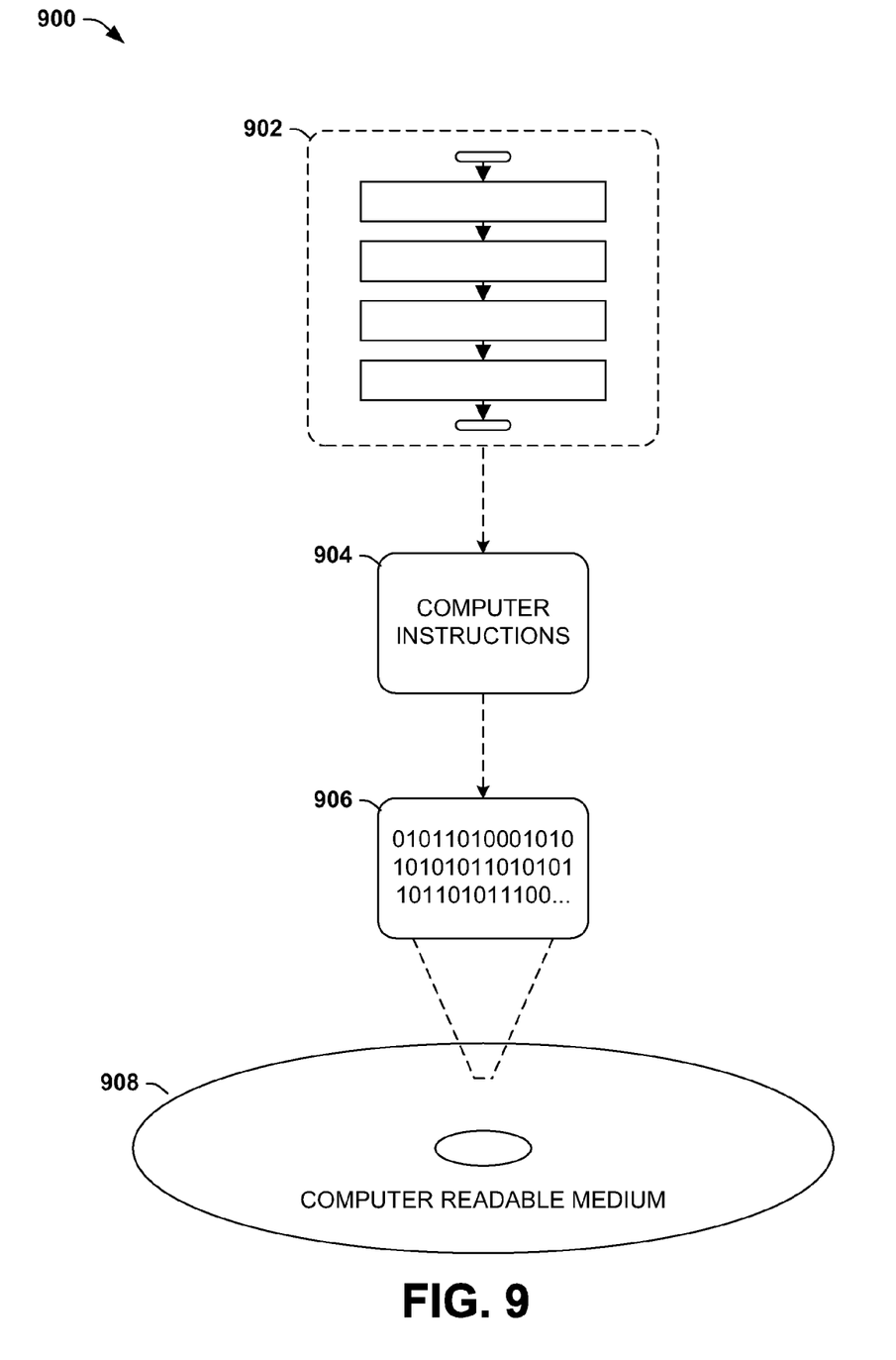
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the processor-executable instructions 904 may be configured to perform a method, such as the exemplary method 100 of FIG. 1, for example. In another such embodiment, the processor-executable instructions 904 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
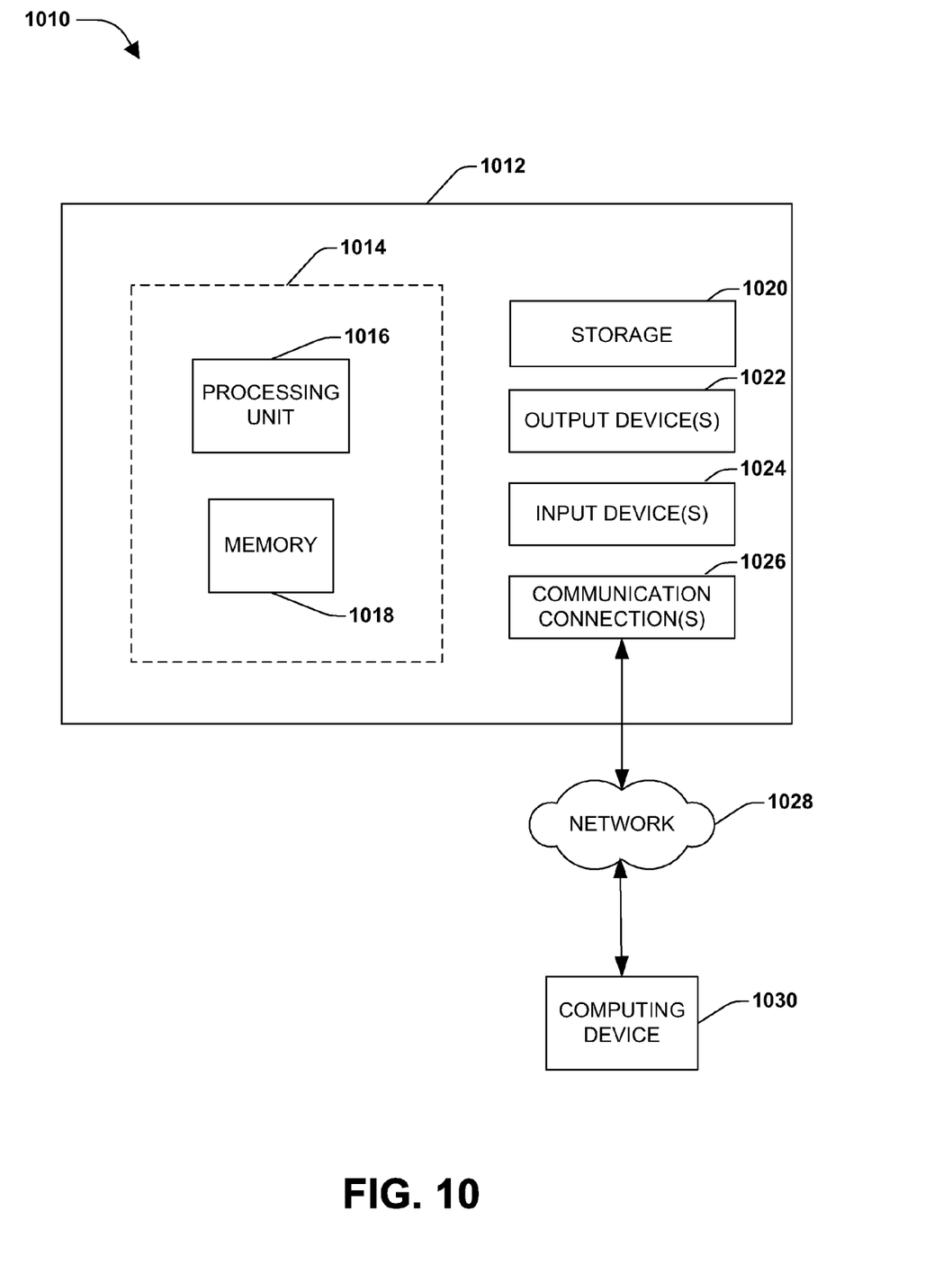
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 122 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    creating a cross-domain frame in a host webpage, the cross-domain frame comprising online ad content from a different domain than a domain of the host webpage;
    creating a user interface on the host webpage;
    displaying host content in a title bar of the user interface;
    responsive to a mouseover event over the online ad content, displaying a source of the online ad content, comprising an IP address associated with the online ad content, in the title bar instead of the host content;
    responsive to a mouseover event over the online ad content, providing for a tooltip box, different than the title bar, to pop up;
    displaying the source of the online ad content in the tooltip box concurrently with displaying the source of the online ad content in the title bar; and
    allowing a user to control the cross-domain frame via the user interface to enable the user to change size and location of the cross-domain frame.

2. The method of claim 1, wherein the host webpage and code for the host webpage are both stored on a server computer.

3. The method of claim 1, further comprising allowing the user to access a task manager to manage the online ad content, the task manager comprising one or more of:
    an ad source manager;
    an ad size manager; or
    an ad control manager.

4. The method of claim 1, wherein creating a user interface on the host webpage comprises linking the host webpage to a code file from an ad syndicator.

5. The method of claim 1, further comprising one or more of:
    displaying a border around the cross-domain frame that delineates the online ad content from the content of the host webpage not within the cross-domain frame; or
    displaying one or more functional buttons for controlling display properties of the cross-domain frame.

6. The method of claim 5, wherein displaying a border comprises displaying a colored line.

7. The method of claim 1, the title bar based upon user input.

8. The method of claim 1, comprising allowing the user to control display properties comprising one or more of:
    sizing the cross-domain frame;
    minimizing the cross-domain frame; or
    maximizing the cross-domain frame.

9. The method of claim 1, the user interface comprising an element in host webpage source code.

10. A user interface, implemented at least in part via a processing unit comprising hardware, and configured to allow users to control display properties of online ad content on a host webpage, the user interface comprising:
displayed functional controls operably coupled to a cross-domain frame comprising the online ad content and configured to affect display properties of the cross-domain frame, the online ad content from a different domain than a domain of the host webpage, the functional controls allowing users to change size and location of the cross-domain frame;
a title bar configured to:
display host content; and
responsive to a mouseover event over the online ad content, display a source of the online ad content instead of the host content; and
a tooltip box configured to:
responsive to a mousehover event over the online ad content, display the source of the online ad content, wherein the source of the online ad content is displayed in the tooltip box concurrently with the display of the source of the online ad content in the title bar.

11. The user interface of claim 10, the host content different than the source of the online ad content.

12. The user interface of claim 10, the source of the online ad content comprising an IP address associated with the online ad content.

13. The user interface of claim 10, the functional controls comprising one or more of:
one or more sizing components configured to resize the cross-domain frame;
a minimizing component configured to minimize the cross-domain frame; or
a maximizing component configured to maximize the cross-domain frame.

14. The user interface of claim 10, further comprising a border delineation component configured to display a border delineating the online ad content from the content of the host webpage not within the cross-domain frame.

15. The user interface of claim 10, further comprising a task manager accessible by a host of the host webpage, configured to manage the online ad content on the host webpage.

16. The user interface of claim 15, the task manager comprising one or more of:
an ad source manager configured to identify a source of at least some of the online ad content;
an ad size manager configured to manage a size of at least some of the online ad content on the host webpage; or
an ad control manager configured to manage an activity status of at least some of the online ad content on the host webpage.

17. A device comprising:
a processor; and
executable instructions operable by the processor, the executable instructions comprising a method for providing user control of online ad content, the method comprising:
creating a cross-domain frame in a host webpage, the cross-domain frame comprising online ad content from a different domain than a domain of the host webpage;
creating a user interface on the host webpage;
responsive to a mouseover event over the online ad content, displaying a source of the online ad content in a title bar of the user interface;
responsive to a mousehover event over the online ad content, providing for a tooltip box, different than the title bar, to pop up;
displaying the source of the online ad content in the tooltip box concurrently with displaying the source of the online ad content in the title bar; and
allowing a user to control the cross-domain frame via the user interface to enable the user to change size and location of the cross-domain frame.

18. The device of claim 17, wherein the user interface comprises an element in host webpage source code.

19. The device of claim 17, wherein creating a user interface on the host webpage comprises linking the host webpage to a code file from an ad syndicator.

20. The device of claim 17, wherein the host webpage and code for the host webpage are both stored on a server computer.

* * * * *